United States Patent
Ko et al.

(10) Patent No.: US 8,223,693 B2
(45) Date of Patent: Jul. 17, 2012

(54) PTA METHOD AND APPARATUS UTILIZING THE SAME

(75) Inventors: Li-Chun Ko, Taipei (TW); Hong-Kai Hsu, Taipei County (TW); Chi-Chen Lee, Taipei (TW); Jiun Jang Su, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 438 days.

(21) Appl. No.: 12/489,588

(22) Filed: Jun. 23, 2009

(65) Prior Publication Data

US 2010/0322159 A1 Dec. 23, 2010

(51) Int. Cl.
*H04Q 7/00* (2006.01)
(52) U.S. Cl. ........................................................ 370/328
(58) Field of Classification Search .................. None
See application file for complete search history.

(56) References Cited

U.S. PATENT DOCUMENTS

| | | | |
|---|---|---|---|
| 7,103,390 B2 * | 9/2006 | Kostiainen | 455/567 |
| 7,519,039 B2 * | 4/2009 | Carter et al. | 370/338 |
| 7,826,411 B2 * | 11/2010 | Gonikberg et al. | 370/328 |
| 7,881,746 B2 * | 2/2011 | Desai | 455/552.1 |
| 7,966,037 B2 * | 6/2011 | Rayzman et al. | 455/552.1 |
| 7,983,216 B2 * | 7/2011 | Iyer et al. | 370/329 |
| 2005/0271010 A1 * | 12/2005 | Capretta | 370/329 |
| 2007/0230648 A1 * | 10/2007 | Gupta et al. | 375/371 |
| 2008/0233875 A1 * | 9/2008 | Desai et al. | 455/41.2 |
| 2009/0081962 A1 * | 3/2009 | Sohrabi | 455/79 |
| 2009/0116437 A1 * | 5/2009 | Alexandre et al. | 370/329 |
| 2010/0197235 A1 * | 8/2010 | Wilhelmsson | 455/63.3 |
| 2010/0202416 A1 * | 8/2010 | Wilhelmsson et al. | 370/336 |

FOREIGN PATENT DOCUMENTS

EP 1 605 643 12/2005

* cited by examiner

*Primary Examiner* — Michael J Moore, Jr.
*Assistant Examiner* — Prenell Jones
(74) *Attorney, Agent, or Firm* — Thomas|Kayden

(57) ABSTRACT

An apparatus includes a first and a second wireless communication modules and a packet traffic arbitration (PTA) module. The first wireless communication module issues a first request for a first transmission or reception operation in a first time period, wherein the first request includes information regarding a first power level for performing the first TX or RX operation. The second wireless communication module issues a second request for a second TX or RX operation in a second time period, wherein the second request includes information regarding a second power level for performing the second TX or RX operation. The packet traffic arbitration module receives the first request and the second request, and grants one or both of the first request and the second request according to the first power level and the second power level when the first time period is overlapped with the second time period.

18 Claims, 18 Drawing Sheets

PTA METHOD AND APPARATUS UTILIZING THE SAME

BACKGROUND OF THE INVENTION

1. Field of the Invention

The invention relates generally to a Packet Traffic Arbitration (PTA) method and an apparatus using the method, and more particularly, to an apparatus that uses the PTA method for coordinating the operation among a plurality of wireless communication modules thereof.

2. Description of the Related Art

In a wireless communication mechanism, a PTA request for TX/RX (transmission/reception) operation is sent for arbitration to determine whether the PTA request should be granted. With the development of wireless communication technology, a modern mobile device may be provided with more than one wireless communication service, such as a Bluetooth, Wireless Fidelity (WiFi) and Worldwide Interoperability for Microwave Access (WiMAX) wireless communication service. In this regard, the overlapping or adjacent operating frequency band among the different wireless communication services causes transmission performances thereof to degrade. Table 1 below shows the operating frequency band for a WiMAX, WiFi and Bluetooth wireless communication service.

TABLE 1

| Category of Wireless Communication Services | | |
|---|---|---|
| Usage | Wireless Communication service | Frequency band |
| Wide Area Network (WAN) | WiMAX | 2.300-2.400 GHz |
| | | 2.496-2.690 GHz |
| | | 3.300-3.800 GHz |
| Local Area Network (LAN) | WiFi | 2.412-2.4835 GHz |
| | | 4.9-5.9 GHz |
| Personal Area Network (PAN) | Bluetooth | 2.402-2.480 GHz |

Thus, the coordination among different wireless communication services has become an important issue.

BRIEF SUMMARY OF THE INVENTION

An embodiment of the invention discloses an apparatus comprising a first wireless communication module, a second wireless communication module and a packet traffic arbitration (PTA) module. The first wireless communication module issues a first request for a first transmission or reception (TX or RX) operation in a first time period, wherein the first request comprises information regarding a first power level for performing the first TX or RX operation. The second wireless communication module issues a second request for a second TX or RX operation in a second time period, wherein the second request comprises information regarding a second power level for performing the second TX or RX operation. The packet traffic arbitration (PTA) module is coupled between the first wireless communication module and the second wireless communication module, receives the first request from the first wireless communication module and the second request from the second wireless communication module, and grants one or both of the first request and the second request according to the first power level and the second power level when the first time period is overlapped with the second time period.

Furthermore, an embodiment of the invention discloses a method for responding to grant and rejection signals issued by a packet traffic arbitrator (PTA) module, performed by a wireless communication module of an apparatus. The method comprises receiving a grant signal in response to a previously issued request for requesting the PTA module for performing a wireless communication operation, receiving a signal indicating that the granted request is rejected by the PTA module before the wireless communication operation finishes, and immediately stopping the wireless communication operation.

An embodiment of the invention also discloses an apparatus comprising a first wireless communication module, a second wireless communication module and a PTA module. The first wireless communication module issues a first request for a first transmission or reception (TX or RX) operation in a first time period, wherein the first request further comprises information regarding a second time period for performing the next of the first TX or RX operation, the second wireless communication module issues a second request for a second TX or RX operation in a third time period overlapping with the second time period after the first RX or RX operation is finished. The PTA module is coupled to the first and second wireless communication modules, determining whether to grant or reject the second request according to information carried by the first and second requests.

BRIEF DESCRIPTION OF THE DRAWINGS

The invention can be more fully understood by reading the subsequent detailed description and examples with references made to the accompanying drawings, wherein:

FIG. 6A-1 shows a diagram of an exemplary operation conflict between a Bluetooth PTA request and a WiMAX PTA request according to an embodiment of the invention;

FIG. 6A-2 shows a proposed solution for solving the operation conflict between a Bluetooth and a WiMAX PTA requests according to an embodiment of the invention;

FIG. 6B-1 shows a diagram of an exemplary operation conflict among a Bluetooth PTA request, a WiMAX PTA request and a WiFi PTA request according to an embodiment of the invention;

FIG. 6B-2 shows a proposed solution for solving the operation conflict among the Bluetooth, WiMAX and WiFi PTA requests according to an embodiment of the invention;

FIG. 6C-1 shows a diagram of another exemplary operation conflict between a Bluetooth PTA request and a WiMAX PTA request according to an embodiment of the invention;

FIG. 6C-2 shows a proposed solution for solving the operation conflict between the Bluetooth and WiMAX PTA requests according to an embodiment of the invention;

FIG. 6D-1 shows a diagram of an exemplary operation between a WiMAX PTA request and a WiFi PTA request according to an embodiment of the invention;

FIG. 6D-2 shows a diagram of a granted simultaneous operation between a WiMAX PTA request and a WiFi PTA requests according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
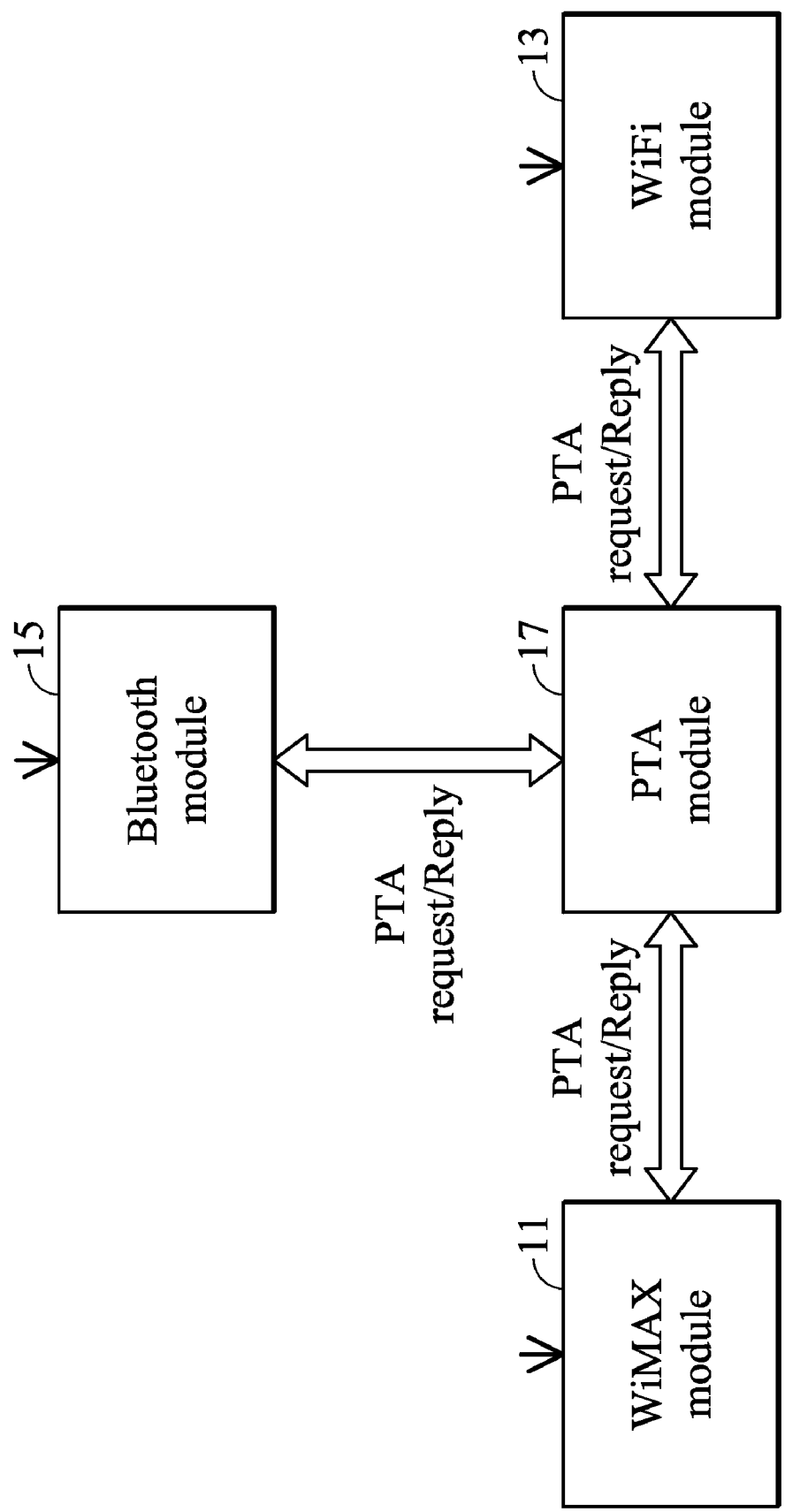
FIG. 1 shows a diagram of an apparatus using a PTA module for coordinating the operation among different wireless communication services such as a WiMAX, WiFi and Bluetooth wireless communication service according to an embodiment of the invention.

FIG. 1 shows a diagram of an apparatus using a PTA module for coordinating the operation among different wireless communication services such as a WiMAX, WiFi and Bluetooth wireless communication service according to an embodiment of the invention. In FIG. 1, the apparatus 10 comprises a WiMAX module 11 implemented based on the Institute of Electrical and Electronics Engineers (IEEE) 802.16 standard, a WiFi module 13 implemented based on the IEEE 802.11 standard, a Bluetooth module 15, and a PTA module 17. The PTA module 17 handles the PTA requests issued from the WiMAX module 11, the WiFi module 13 and the Bluetooth module 15, and determines which PTA request is granted. Note that, those skilled in the art may realize the WiMAX, WiFi and Bluetooth modules 11, 13 and 15 sharing two antennas or less.

Figure 2A:
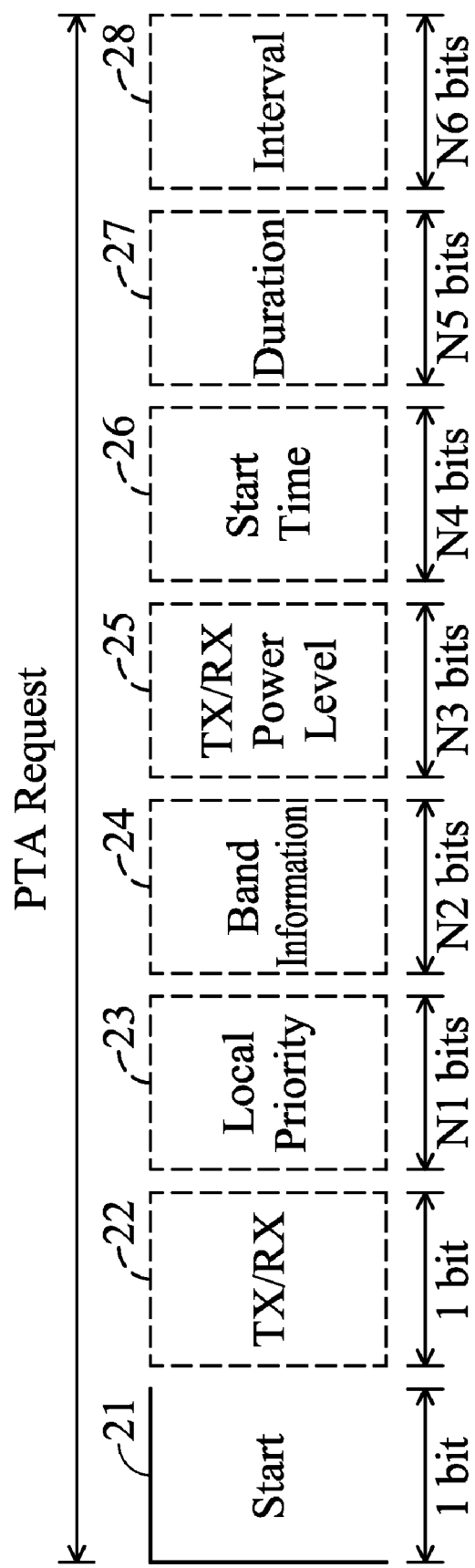
FIG. 2A shows a PTA request configuration according to an embodiment of the invention.

FIG. 2A shows a PTA request configuration according to an embodiment of the invention. A PTA request may comprise 8 fields: Start (1 bit) 21, TX/RX (1 bit) 22, Local Priority (N1 bits) 23, Band Information (N2 bits) 24, TX/RX Power Level (N3 bits) 25, Start Time (N4 bits) 26, Duration (N5 bits) 27 and Interval (N6 bits) 28. The Start field 21 indicates the initialization of a PTA request, which is always set as 1. The TX/RX field 22 indicates that the PTA request is a TX or RX operation. If the bit is set as 0, for example, it indicates a TX operation and vice versa. The Local Priority field 23 indicates the local priority of the PTA request, which is further mapped into a global priority. The PTA module 17 uses the global priority information to determine which PTA request is granted. The local priority level of representative WiMAX packets is categorized as:

(1) Level 0: MAPs (downlink control information) packets, which has the highest priority. MAP packets refer to packets broadcasted by a WiMAX base station to mobile stations, defining access to the downlink channel or uplink channel thereof (e.g. data reception or transmission interval for designated mobile station).

(2) Level 1: real-time or voice data packets (ex. Unsolicited Grant Service).

(3) Level 2: other packets, which have lowest priority.

In addition, the local priority level of representative Bluetooth packets is categorized as:

(1) Level 0: Synchronous Connection-Oriented (SCO), Extended Synchronous Connection-Oriented (e-SCO) or inquiry packets, which has the highest priority.

(2) Level 1: other packets.

In addition, the local priority level of representative WiFi packets is categorized as:

(1) Level 0: Beacon packets, which has the highest priority.

(2) Level 1: other packets.

The local priority of different type of packets for WiMAX, Bluetooth and WiFi is then mapped into a global priority table, which may be stored in a non-volatile memory or storage device of the PTA module 17, as shown in Table 2:

TABLE 2

Global Priority of WiMAX, Bluetooth and WiFi

| Global Priority | Type | Local Priority |
| --- | --- | --- |
| 0 | WiMAX MAPs | 0 |
| 1 | Bluetooth High Priority Packets | 0 |
| 2 | WiFi Beacon Packets | 0 |
| 3 | WiMAX UGS | 1 |
| 4 | Bluetooth Low Priority Packets | 1 |
| 5 | WiMAX BE Packets | 2 |
| 6 | WiFi Data Packets | 1 |

In another application, the above table may be adjusted to set the global priority 0 to a Tx or Rx operation for the Bluetooth High Priority Packets; the global priority 1 to a Tx or Rx operation for the WiMAX MAPs; and the global priority 2 to an Tx or Rx operation for the WiFi Beacon Packets. In still another application, the above table may be adjusted to set the global priority 0 to a Tx or Rx operation for the Bluetooth High Priority Packets; the global priority 1 to a Tx or Rx operation for the WiFi Beacon Packets; and the global priority 2 to a Tx or Rx operation for the WiMAX MAPs.

Referring back to FIG. 2, the Band Information field 24 indicates the band information index setting for a wireless communication service. The band information for WiMAX, Bluetooth and WiFi, which may be stored in a non-volatile memory or storage device of the PTA module 17, are shown in the following Tables 3-1 to 3-3 respectively:

TABLE 3-1

Band Information of WiMAX

| Index | Band Information (WiMAX) |
| --- | --- |
| 0 | 2.300~2.310 GHz |
| 1 | 2.310~2.320 GHz |
| ... | ... |
| 9 | 2.390~2.400 GHz |
| 10 | 2.500~2.510 GHz |
| 11 | 2.510~2.520 GHz |
| ... | ... |
| 19 | 2.590~2.600 GHz |
| 20 | Other (don't case) |

TABLE 3-2

Band Information of Bluetooth

| Index | Band Information (Bluetooth) |
| --- | --- |
| 0 | 2.402 GHz |
| 1 | 2.403 GHz |

TABLE 3-2-continued

Band Information of Bluetooth

| Index | Band Information (Bluetooth) |
|---|---|
| 2 | 2.404 GHz |
| ... | ... |
| ... | ... |
| ... | ... |
| ... | ... |
| ... | ... |
| 78 | 2.480 GHz |

TABLE 3-3

Band Information of WiFi

| Index | Band Information (WiFi) |
|---|---|
| 1 | 2.412 GHz |
| 2 | 2.417 GHz |
| 3 | 2.422 GHz |
| ... | ... |
| ... | ... |
| ... | ... |
| ... | ... |
| 13 | 2.472 GHz |
| 14 | 2.484 GHz |

As shown in Table 3-1, the number of WiMAX bands is 21. Therefore, the required length of the Band Information field is 5 bits. Similarly, referring to Tables 3-2 and 3-3, the required lengths of Bluetooth and WiFi bands are 7 and 4 bits, respectively.

Figures 1, 6A:
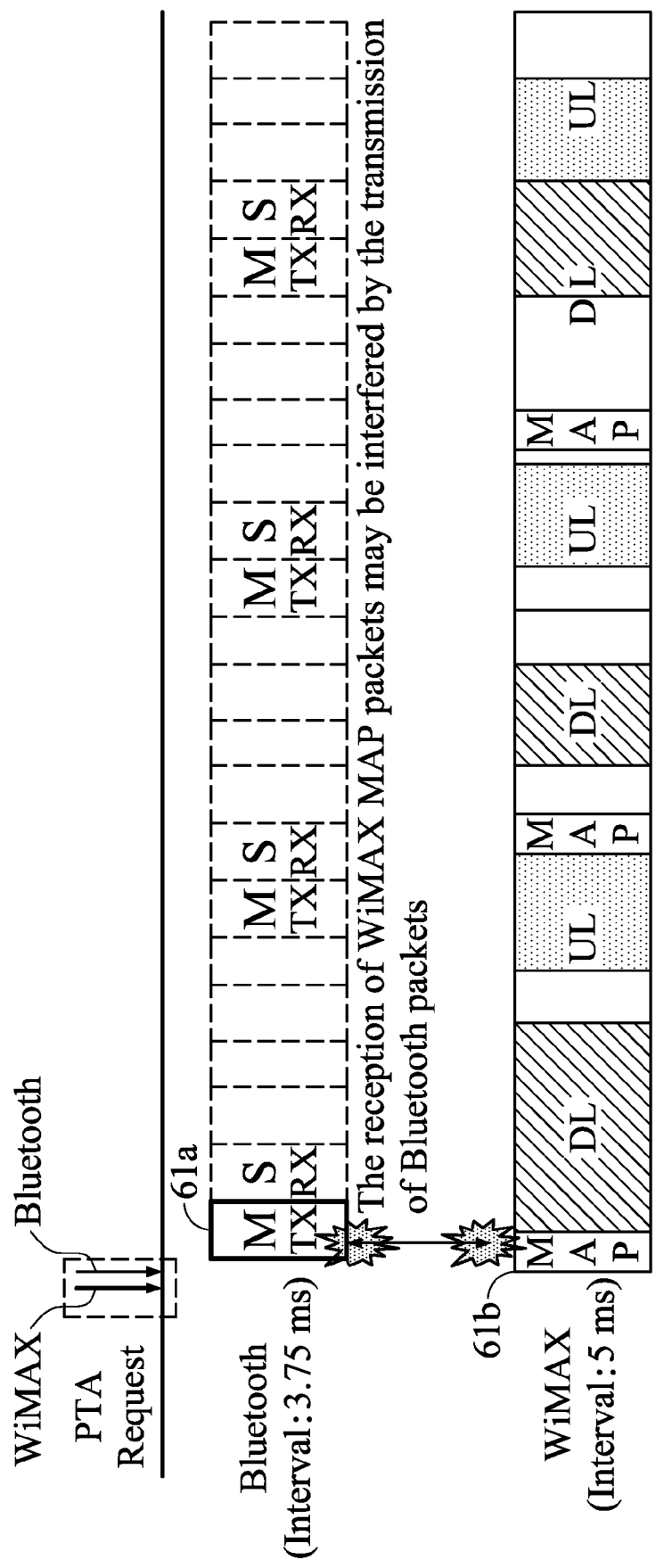
Figures 2, 6A:
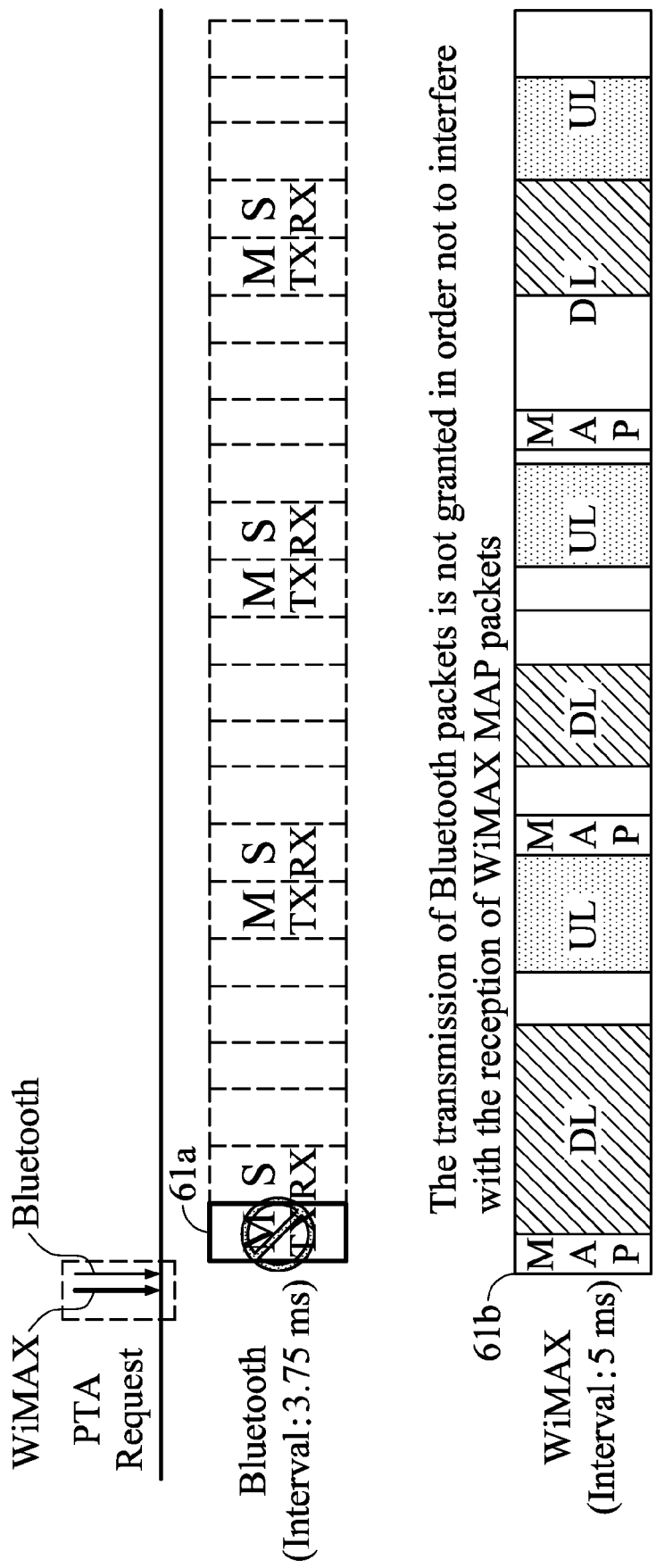

Referring to FIG. 2, for a TX operation PTA request, the TX/RX Power Level field 25 indicates the TX power level setting index. Similarly, for an RX operation PTA request, the TX/RX Power Level field 25 indicates the RX power level setting index. The power level information for WiMAX, Bluetooth and WiFi are shown in the following Table 4:

TABLE 4

Power Level Information of WiMAX, Bluetooth and WiFi

| Index | Power Level (WiMAX) | Index | Power Level (Bluetooth) | Index | Power Level (WiFi) |
|---|---|---|---|---|---|
| 0 | >30 dBm | 0 | >0 dBm | 0 | >20 dBm |
| 1 | >20 dBm | 1 | >−15 dBm | 1 | >10 dBm |
| 2 | >10 dBm | 2 | >−30 dBm | 2 | >0 dBm |
| 3 | >0 dBm | 3 | <−30 dBm | 3 | >−10 dBm |
| 4 | >−10 dBm | N/A | N/A | 4 | >−20 dBm |
| 5 | >−20 dBm | N/A | N/A | 5 | >−30 dBm |
| 6 | >−30 dBm | N/A | N/A | 6 | >−40 dBm |
| 7 | >−40 dBm | N/A | N/A | 7 | <−40 dBm |
| 8 | >−50 dBm | N/A | N/A | N/A | N/A |
| 9 | >−60 dBm | N/A | N/A | N/A | N/A |
| 10 | >−70 dBm | N/A | N/A | N/A | N/A |
| 11 | >−80 dBm | N/A | N/A | N/A | N/A |
| 12 | >−90 dBm | N/A | N/A | N/A | N/A |
| 13 | <−90 dBm | N/A | N/A | N/A | N/A |

Figure 2B:
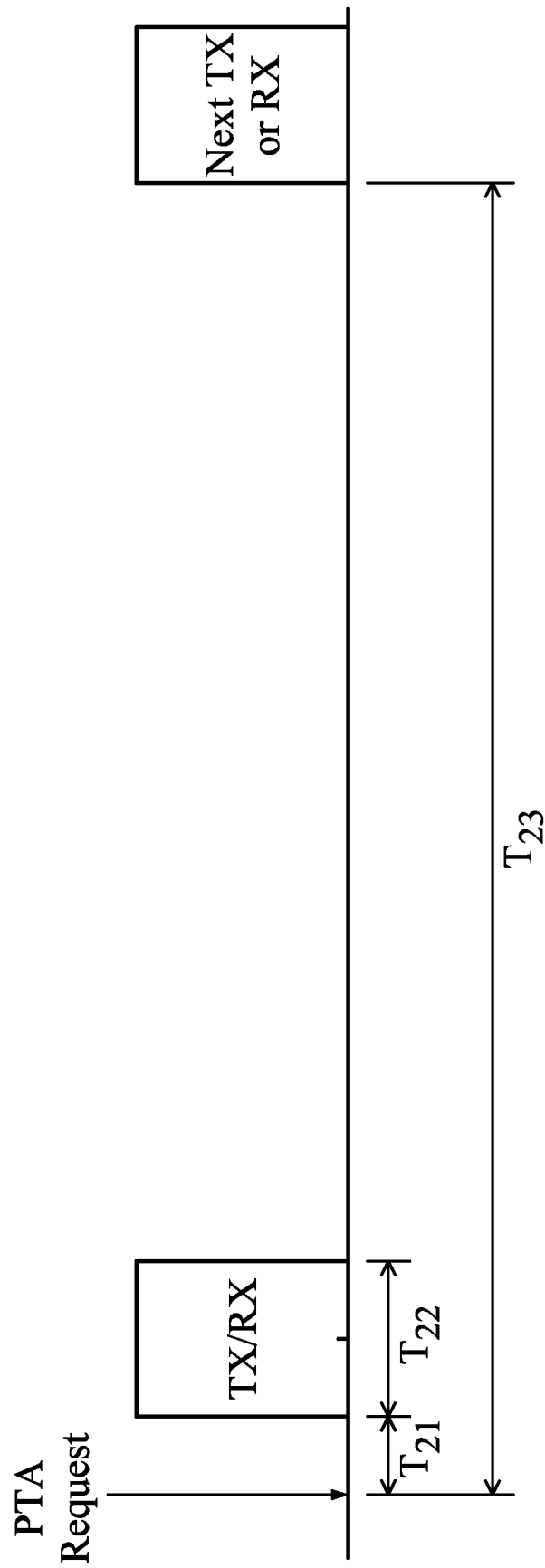
FIG. 2B is a diagram illustrating periodical TX/RX operations.

FIG. 2B is a diagram illustrating periodical TX/RX operations. Together with FIG. 2A, for a PTA request, the Start Time field 26 indicates a time period between the start of the TX/RX operation and the issuance time of the PTA request $t_{21}$ to notify the PTA module when will be the requested TX/RX operation started. The Duration field 27 indicates the time duration requiring for the requested TX/RX operation $t_{22}$. The Interval field 28 indicates a time period between the start of the next TX/RX operation and the issuance time of the PTA request $t_{23}$ to notify the PTA module when will be the next TX/RX operation started if the requested TX/RX operation is periodically occurred. The time duration required for the next TX/RX operation may be the same as the currently requested TX/RX operation. The Interval field 28 is zero if the requested TX/RX operation is not periodically occurred.

Figure 3A:
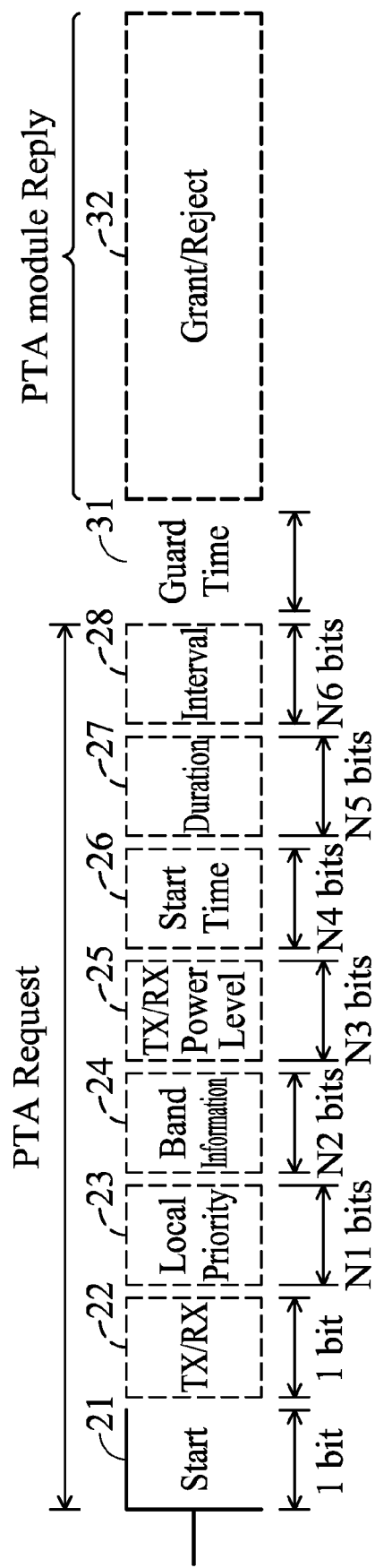
FIG. 3A shows a process of a PTA module granting a PTA request according to an embodiment of the invention.

As stated above, the PTA module 17 handles the PTA requests from the WiMAX module 11, the WiFi module 13 and the Bluetooth module 15, and determines whether to grant the PTA requests. There are three possible scenarios that may evolve:

(1) The PTA module 17 may determine that there is no operation conflict between the PTA requests in a forthcoming time period. Therefore, the PTA module 17 grants all PTA requests. In this case, referring to FIG. 3A, the PTA module 17 may set the PTA signal as "1" (or logic high) to the granted modules, denoted as 32, following the Guard Time 31 until the TX/RX operation is finished.

Figure 3B:
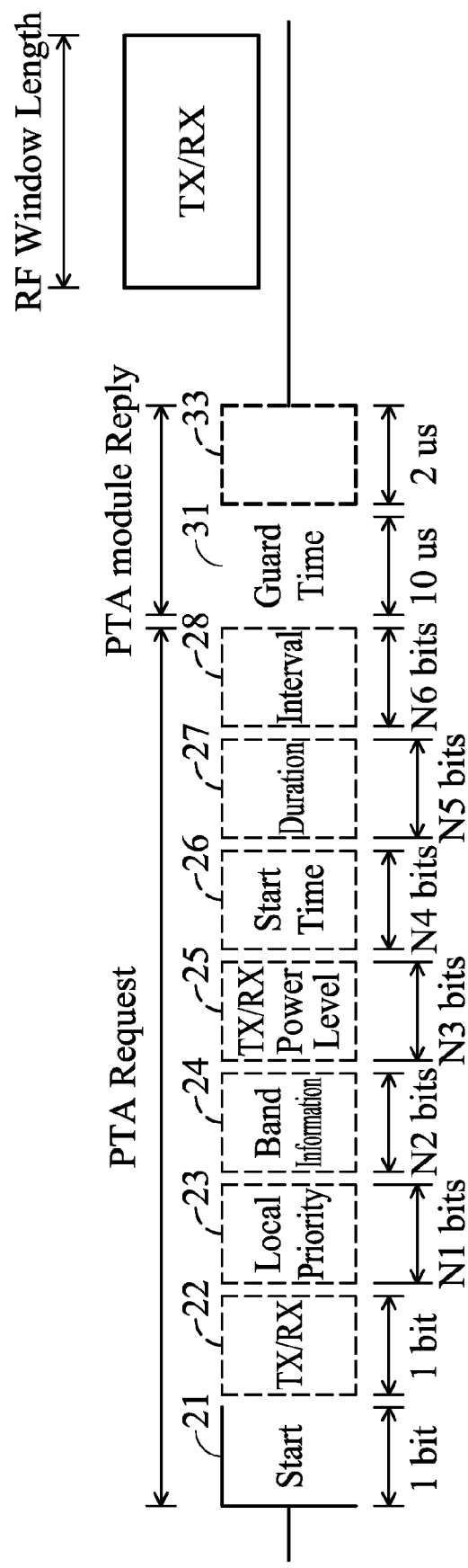
FIG. 3B shows a process of a PTA module rejecting a PTA request according to an embodiment of the invention.

(2) The PTA module 17 may determine that there is an operation conflict between the PTA requests in a forthcoming time period. Therefore, the PTA module 17 determines which PTA request is granted and which PTA request or requests is or are rejected. In this case, referring to FIG. 3B, for the PTA request that is rejected, the PTA module 17 may set the PTA signal as "0" (or logic low) to the rejected module(s) for 2 μs long, denoted as 33, following the Guard Time 31. In response to the rejection, if the rejected PTA request is for TX operation, the requesting wireless communication module (such as WiMAX module 11, the WiFi module 13 or the Bluetooth module 15) does not perform the TX operation. If the rejected PTA request is for RX operation, the requesting wireless communication module can freely decide whether to perform the RX operation. This is because the TX operation of the rejected PTA request may affect another granted TX or RX operation. Therefore, the rejected wireless communication module should not perform the TX operation to avoid interference with another granted TX or RX operation. On the contrary, the RX operation of the rejected PTA request can receive data in an attempt and may fortunately obtain data when the media is not very bad.

Figure 3C:
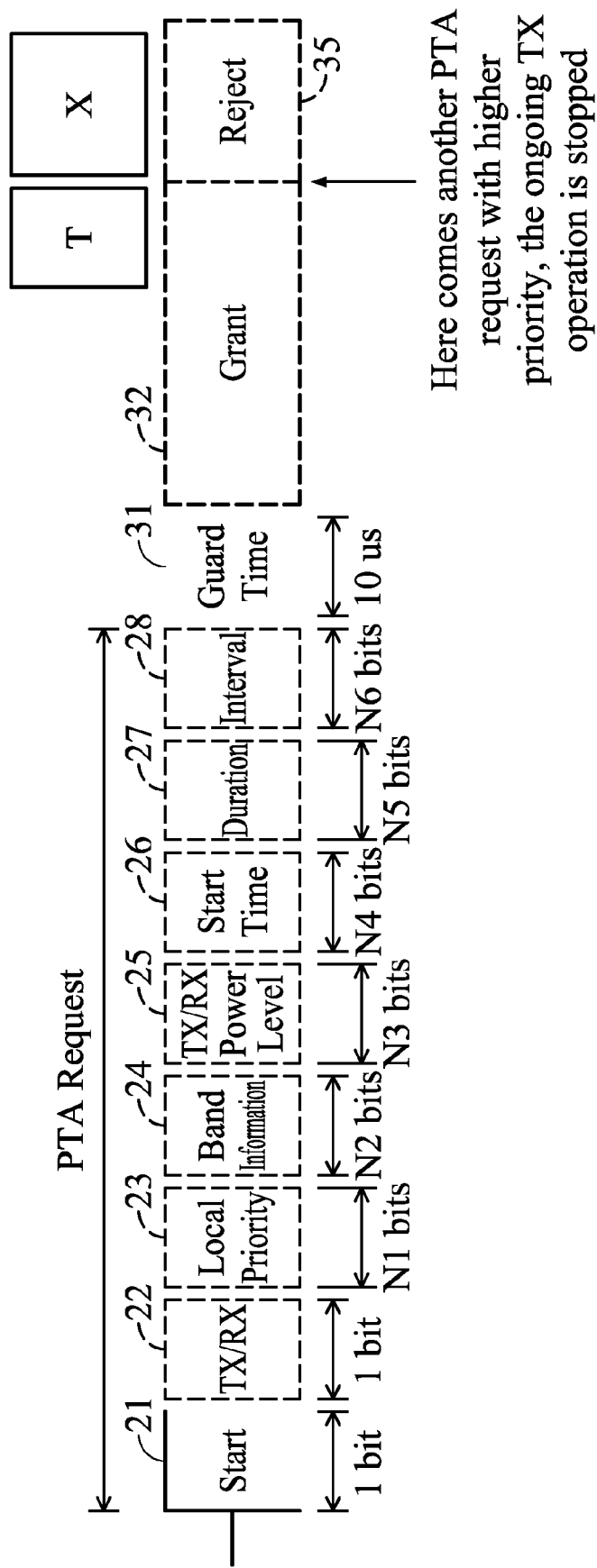
FIGS. 3C and 3D shows a process of a PTA module taking back a granted PTA request when granting a newly coming PTA request according to an embodiment of the invention.
Figure 3D:
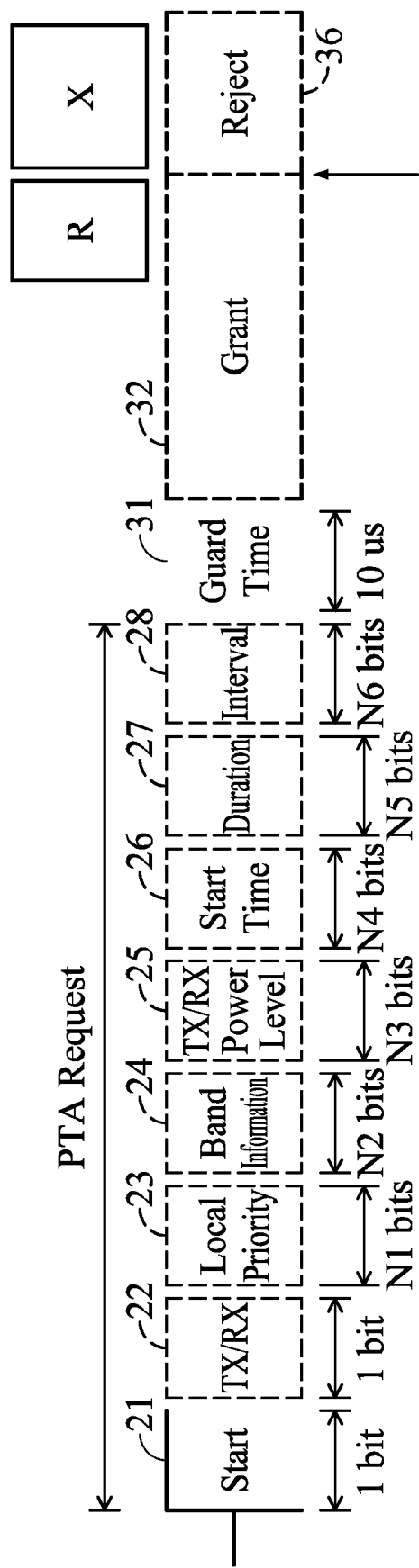

(3) The PTA module 17 may grant a PTA request and later take the granted PTA request back when the granted TX or RX operation conflicts with a newly coming PTA request with a higher priority PTA request. If the rejected PTA request is for TX operation, the wireless communication module stops the TX operation, referring to 35 of FIG. 3C. If the rejected PTA request is for RX operation, the wireless communication module freely decides whether to finish the RX operation, referring to 36 of FIG. 3D.

Figure 4:
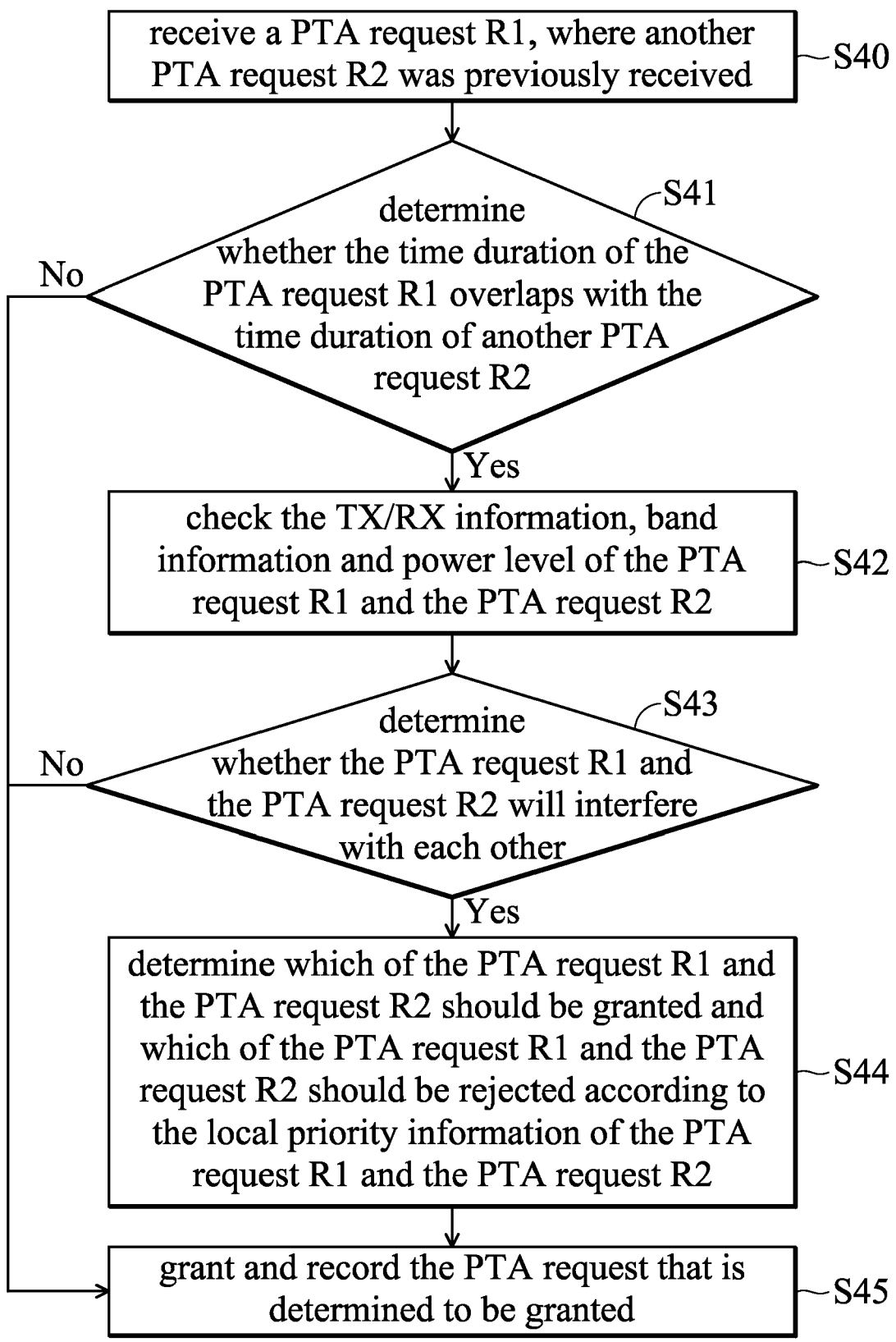
FIG. 4 shows a flowchart of a PTA request arbitration performed by a PTA module according to an embodiment of the invention.

FIG. 4 shows a flowchart of a PTA request arbitration performed by a PTA module according to an embodiment of the invention. In the beginning, a PTA request R1 is received, where another PTA request R2 was previously received (step S40). Next, it is determined whether the time duration of the PTA request R1 overlaps with the time duration of another PTA request R2 (step S41). If not, the PTA request R1 is granted and recorded (step S45). If so, the PTA module 17 checks the TX/RX information, band information and power levels of the PTA request R1 and the PTA request R2 (step S42), and determines whether the PTA request R1 and the PTA request R2 will interfere with each other accordingly (step S43). Although the durations of these two requests are overlapped, the PTA request R1 and the PTA request R2 will not interfere with each other, for an example, if the TX power level of a PTA request (may be PTA request R1 or R2) is low enough, such as lower than −10 dBm, and the RX power level of another PTA request is high enough, such as higher than −30 dBm. Or, for another example, if the following conditions are satisfied: the TX power level of a PTA request (may be PTA request R1 or R2) is smaller than a predetermined value, such as 15 dBm, the RX power level of another PTA request is greater than a predetermined value, such as −30 dBm, and the frequency band of the PTA request R1 is separated from the frequency band of the PTA request R2 by a predetermined value, such as 20 MHz. If the conditions are satisfied, the PTA request R1 is granted and recorded (step S45). If the conditions are not satisfied, the PTA module 17 determines which of the PTA request R1 and the PTA request R2 should be granted and which of the PTA request R1 and the PTA request R2 should be rejected according to the global priority information of the PTA request R1 and the PTA request R2 (step S44). Finally, the PTA module 17 grants the PTA request with higher priority and records the granted PTA request (step S45).

Figure 5:
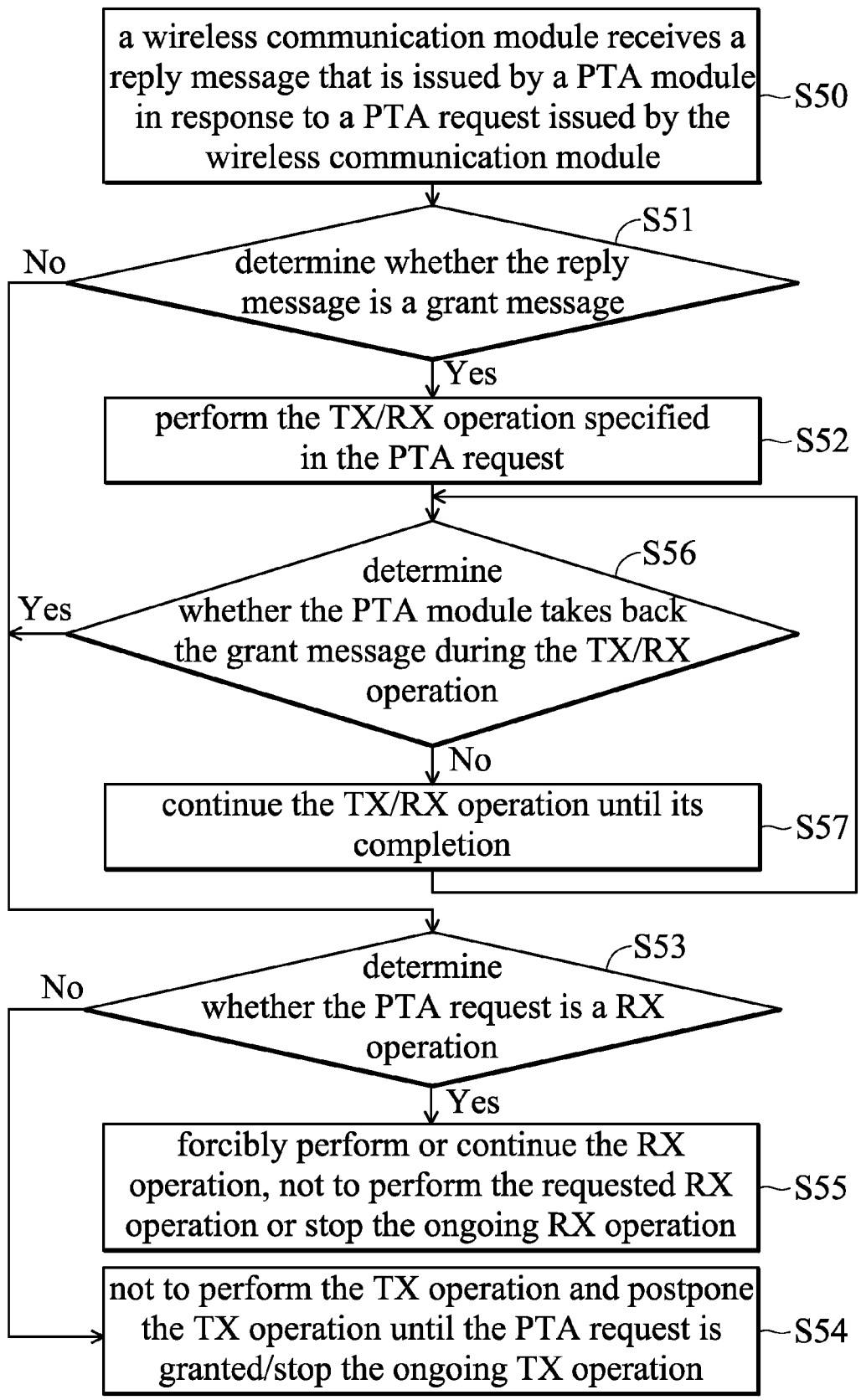
FIG. 5 shows a flowchart performed by a wireless communication module for performing the TX/RX operation in response to reply messages from a PTA module according to an embodiment of the invention.

FIG. 5 shows a flowchart performed by a wireless communication module for performing the TX/RX operation in response to reply messages from a PTA module according to an embodiment of the invention. In the beginning, a wireless communication module receives a reply message that is issued by a PTA module 17 in response to a PTA request previously issued by the wireless communication module (step S50). Next, the wireless communication module determines whether the reply message is a grant message (step S51). If so (grant message), the wireless communication module performs the TX/RX operation specified in the PTA request (step S52). If not (rejection message), the wireless communication module determines whether the PTA request is an RX operation (step S53). If not (TX operation), the wireless communication module doesn't perform the TX operation and postpones the TX operation until the next PTA request is granted (step S54). If so (RX operation), the wireless communication module may forcibly perform or not perform the requested RX operation (step S55). Following the step S52, the wireless communication module periodically determines whether the PTA module takes the grant message back during the ongoing TX/RX operation (step S56). If not, the wireless communication module continues the TX/RX operation as usual until its completion (step S57). If so, the procedure proceeds to step S53, wherein the wireless communication module determines whether the PTA request is an RX operation. If not (TX operation), the wireless communication module stops the ongoing TX operation (step S54). If so (RX operation), the wireless communication module may forcibly continue the remaining RX operation or stop the ongoing RX operation (step S55).

FIG. 6A-1 shows a diagram of an exemplary operation conflict between a Bluetooth PTA request for transmitting Bluetooth packets 61a and a WiMAX PTA request for receiving WiMAX MAP packets 61b according to an embodiment of the invention. In FIG. 6A-1, the WiMAX PTA request comes before the Bluetooth PTA request, and the PTA module 17 determines that the time duration of the Bluetooth PTA request overlaps with the time duration of the WiMAX PTA request. In this case, the transmission of Bluetooth packets may interfere with the reception of WiMAX MAP packets, so other factors are taken into consideration. Referring to FIG. 6A-2 which shows a proposed solution for solving the operation conflict according to an embodiment of the invention, the PTA module 17 further checks the TX power level specified in the Bluetooth PTA request, the RX power level specified in the WiMAX PTA request, and the frequency band of the two PTA requests, and determines that the condition stated in step S43 is not satisfied. Therefore, the PTA module 17 determines that the transmission of Bluetooth packets 61a will interfere with the reception of WiMAX MAP packets 61b. Following, the PTA module 17 checks the global priority information shown in Table 2 and determines that the WiMAX MAP packets have the highest priority. Therefore, the Bluetooth PTA request is rejected and its Bluetooth packets transmission 61a is postponed by a period so that the reception of WiMAX MAP packets 61b will not be interfered. Wherein, the Bluetooth packets transmission 61a can be postponed by the PTA module 17 since the Bluetooth PTA request is a periodic (3.75 millisecond) request.

Figures 1, 6B:
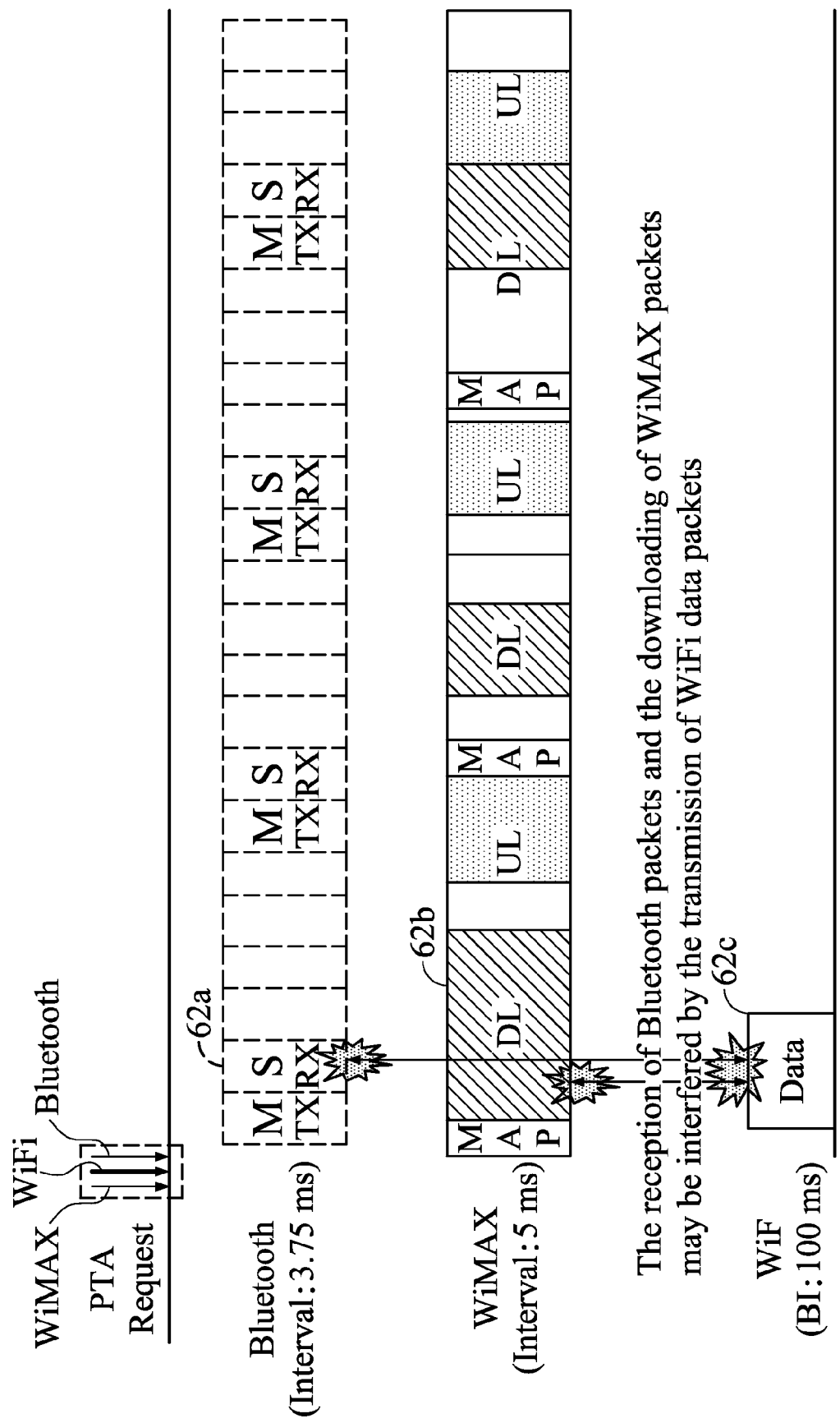
Figures 2, 6B:
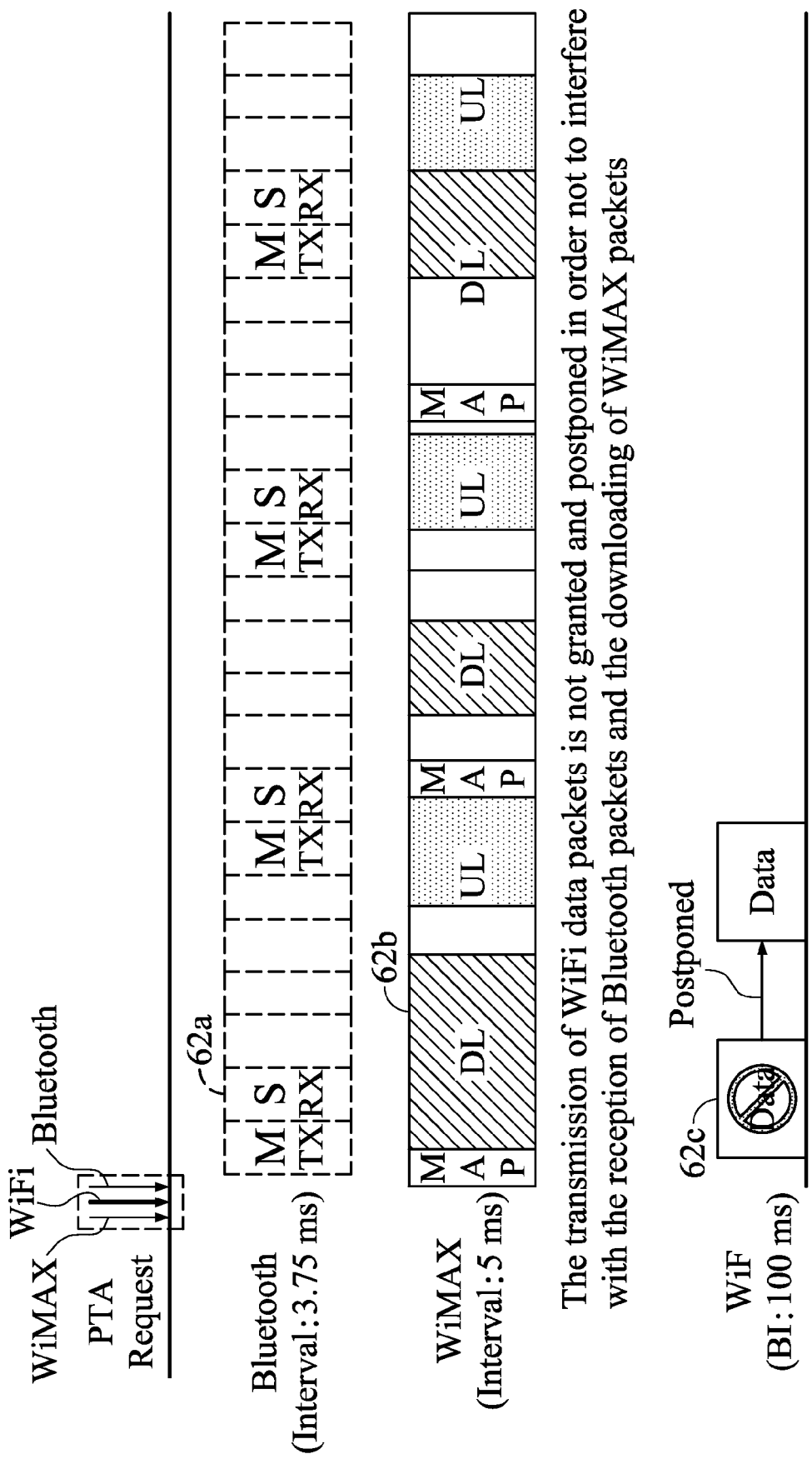

FIG. 6B-1 shows a diagram of another exemplary operation conflict among a Bluetooth PTA request for receiving Bluetooth packets 62a, a WiMAX PTA request for downloading WiMAX packets 62b and a WiFi PTA request for transmitting WiFi data packets 62c according to an embodiment of the invention. In FIG. 6B-1, the WiMAX PTA request comes first, followed by the WiFi PTA request and the Bluetooth PTA request. The PTA module 17 then determines that the time duration of the WiFi PTA request overlaps with the time duration of the Bluetooth PTA request and the WiMAX PTA request. In this case, the transmission of WiFi data packets 62c may interfere with the reception of Bluetooth packets and the downloading of WiMAX packets 62b, so other factors are taken into consideration. Referring to FIG. 6B-2 which shows a proposed solution for solving the operation conflict according to an embodiment of the invention, the PTA module 17 further checks the TX power level specified in the WiFi PTA request, the RX power level specified in the WiMAX and Bluetooth PTA requests, the frequency band of the three PTA requests, and determines that the condition stated in step S43 is not satisfied. Therefore, the PTA module 17 determines that the transmission of WiFi data packets 62c will interfere with the reception of Bluetooth packets and the downloading of WiMAX packets 62b. Following, the PTA module 17 checks the global priority information shown in Table 2 and determines that the WiFi data packets have lowest priority. Therefore, the WiFi PTA request is rejected and its WiFi data packets transmission 62c is postponed by the PTA module 17 until the reception of Bluetooth packets 62a and the downloading of WiMAX packets 62b are finished. In this manner, the reception of Bluetooth packets 62a and the downloading of WiMAX packets 62b will not be interfered.

Figures 1, 6C:
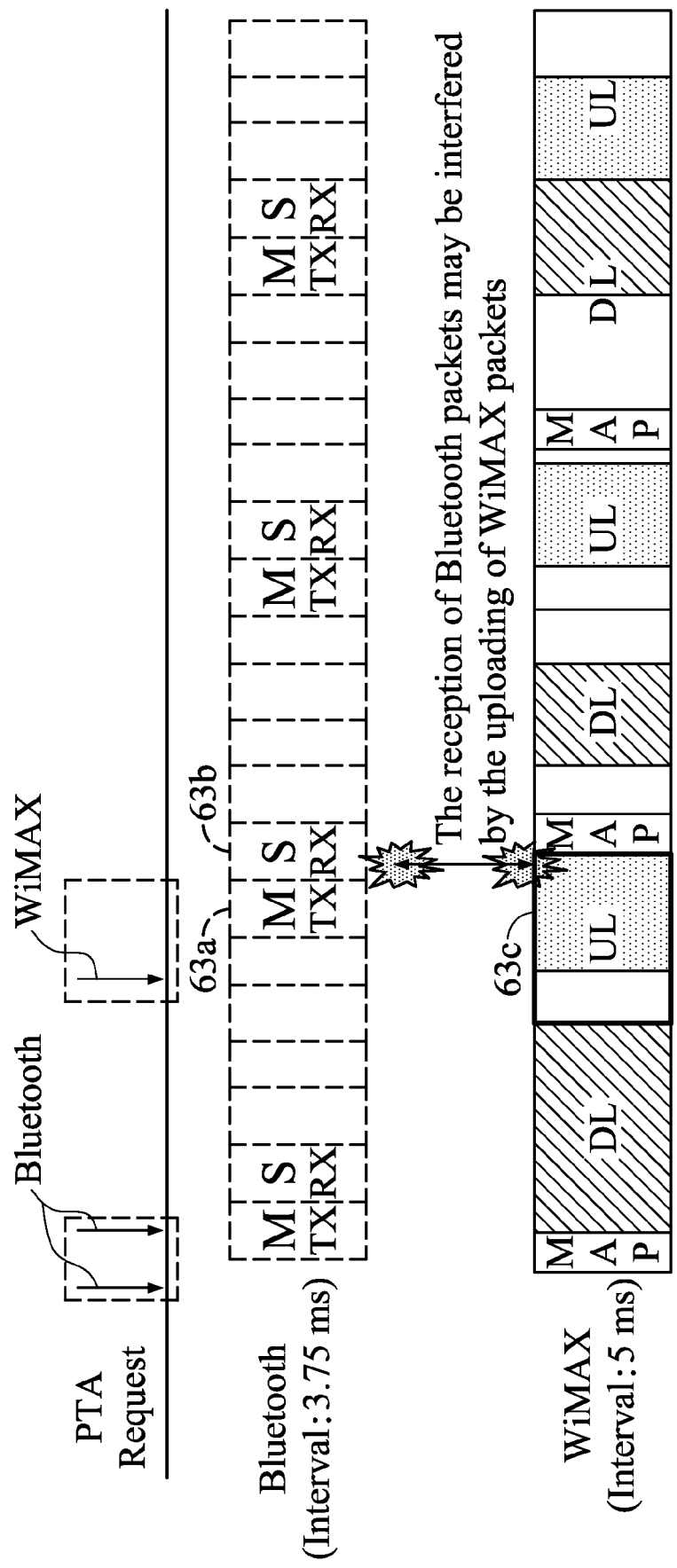
Figures 2, 6C:
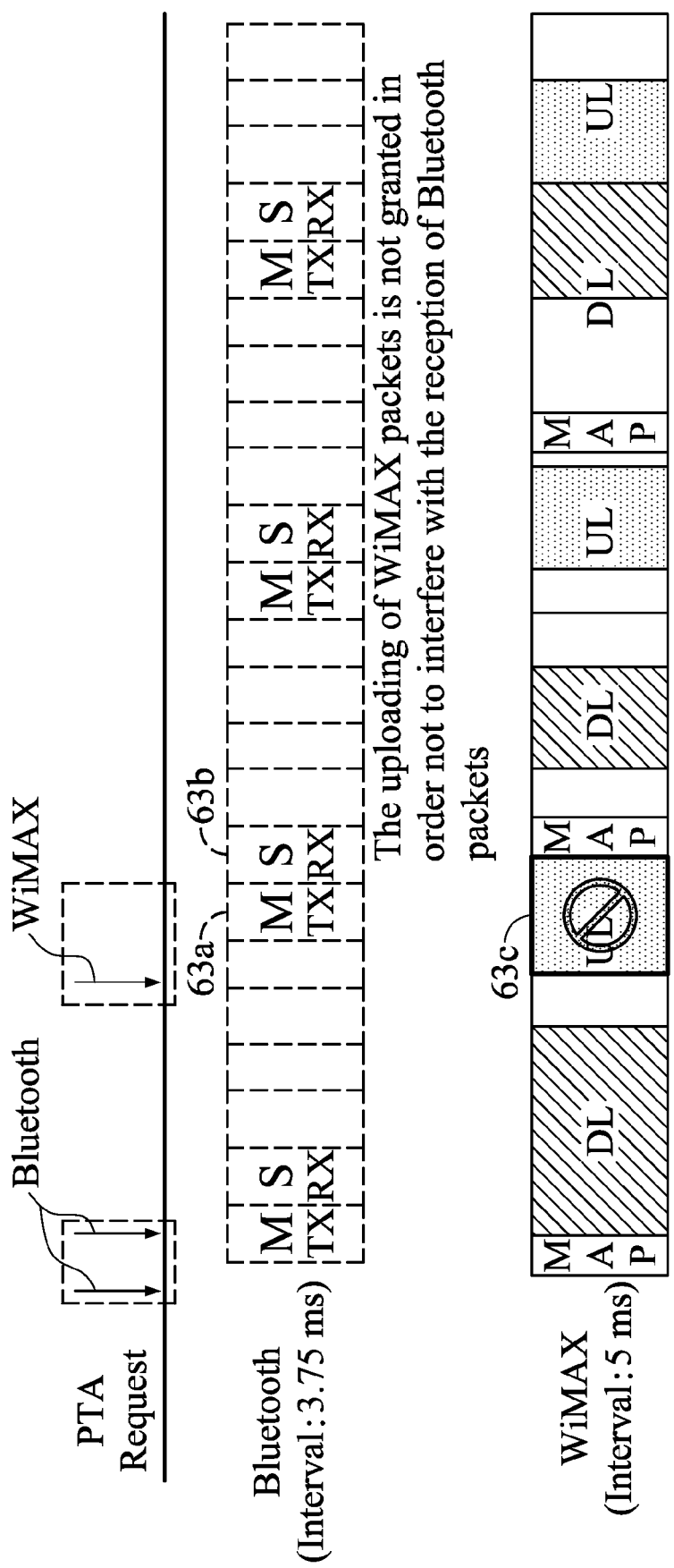

FIG. 6C-1 shows a diagram of another exemplary operation conflict between a Bluetooth PTA request for receiving Bluetooth packets 63b and a WiMAX PTA request for uploading WiMAX packets 63c according to an embodiment of the invention. In FIG. 6C-1, only the WiMAX PTA request is presented at the beginning. Referring to FIG. 6C-2 which shows a proposed solution for solving the operation conflict according to an embodiment of the invention, even though only the WiMAX PTA request is present at the beginning, the uploading of WiMAX packets 63c is still not granted. This is because the PTA module 17 is able to determine the receipt of the next Bluetooth PTA request 63b by the interval information specified in the prior Bluetooth PTA request, as shown in FIG. 6A-1 or 6A-2 also. Based on this, the PTA module 17 determines that the time duration of the current WiMAX PTA request overlaps with the time duration of the next Bluetooth PTA request to be received. In this case, the uploading of WiMAX packets 63c may interfere with the reception of Bluetooth packets 63b, so other factors are taken into consideration. Next, the PTA module 17 further checks the TX power level specified in the WiMAX PTA request, the RX power level specified in the Bluetooth PTA request, the frequency band of the two PTA requests, and determines that the uploading of WiMAX packets 63c will interfere with the reception of Bluetooth packets 63b. Following, the PTA module 17 further checks the global priority information shown in Table 2 and determines that the WiMAX packets have lower priority. Therefore, the WiMAX PTA request is rejected before the Bluetooth PTA request comes out. In this manner, the reception of Bluetooth packets 63b that is going to take place will not be interfered.

Figures 1, 6D:
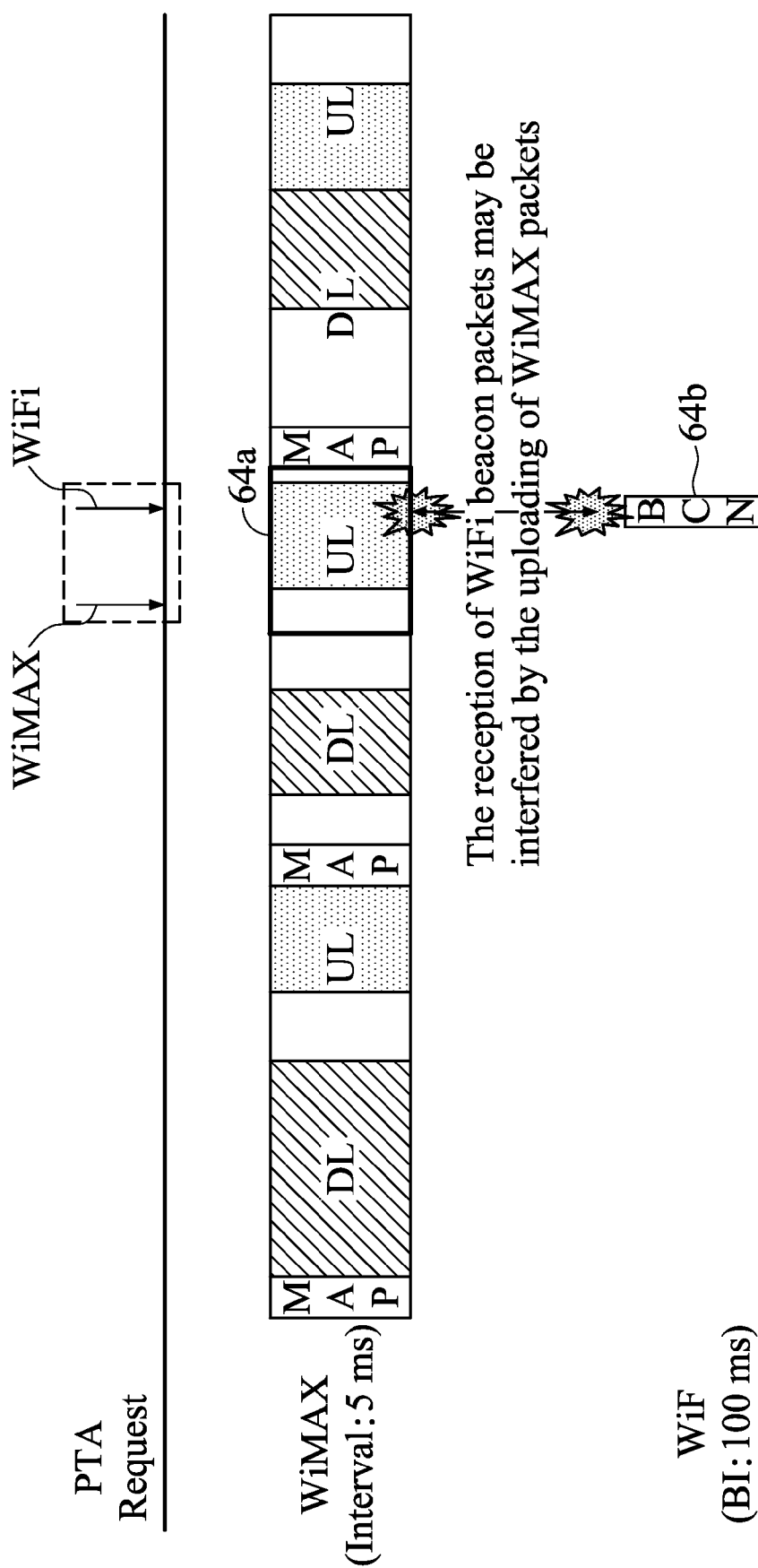
Figures 2, 6D:
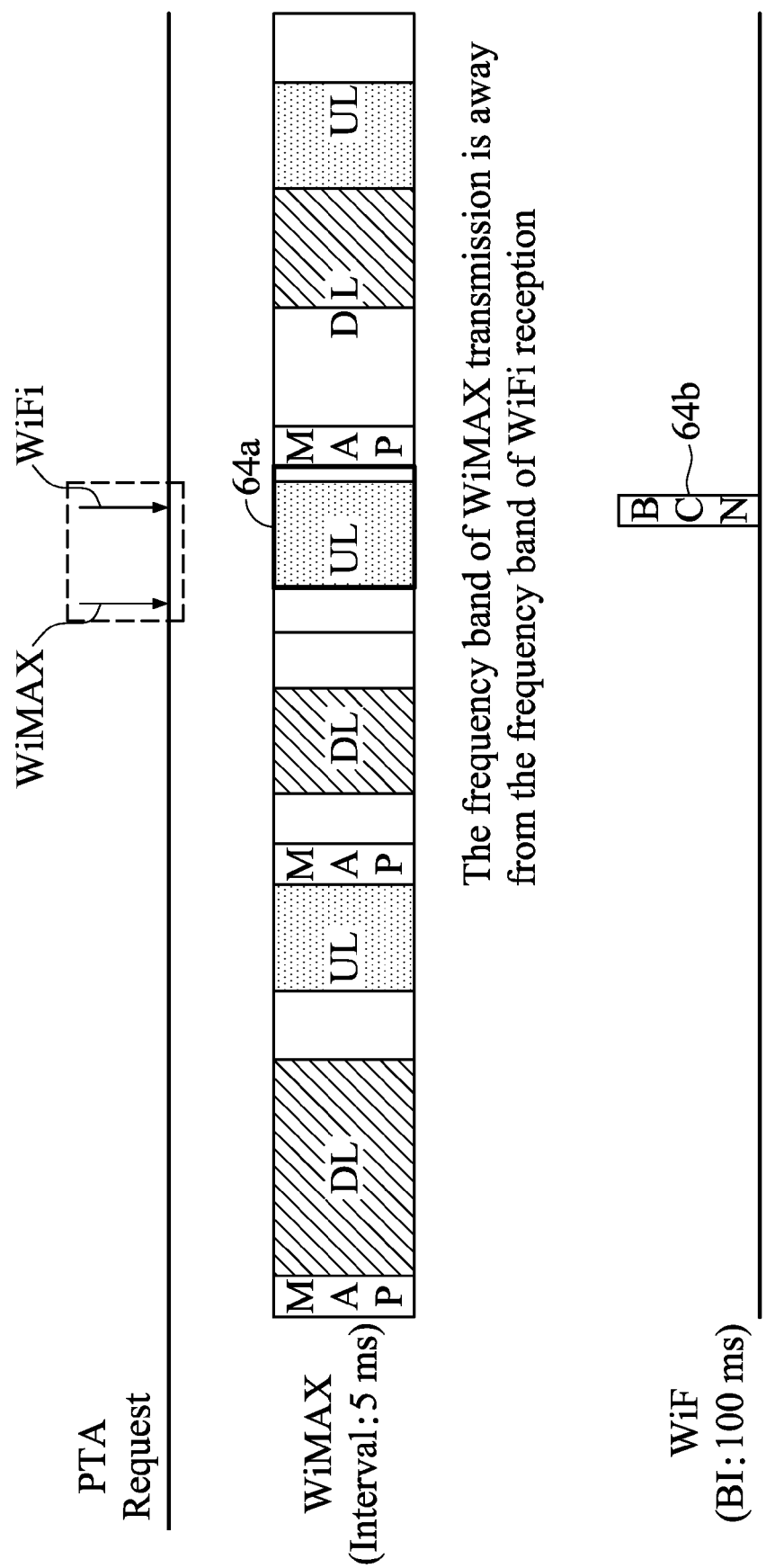

FIG. 6D-1 shows a diagram of another exemplary operation between a WiMAX PTA request for uploading WiMAX packets 64a and a WiFi PTA request for receiving WiFi Beacon packets 64b according to an embodiment of the invention. In FIG. 6D-1, the WiMAX PTA request comes before the WiFi PTA request and the PTA module 17 determines that the time duration of the WiFi PTA request overlaps with the time duration of the WiMAX PTA request. In this case, the uploading of WiMAX packets 64a may interfere with the reception of WiFi Beacon packets 64b, so other factors are taken into consideration. Referring to FIG. 6D-2, the PTA module 17 further checks the TX power level specified in the WiMAX PTA request, and the RX power level specified in the WiFi PTA request, the frequency band of the two PTA requests, and determines that the uploading of WiMAX packets 64a will not interfere with the reception of WiFi Beacon packets 64b since their frequency band separation is greater than 20 MHz. Therefore, the PTA module 17 allows the uploading of WiMAX packets 64a and the reception of WiFi Beacon packets 64b to be taken place simultaneously.

Figure 7:
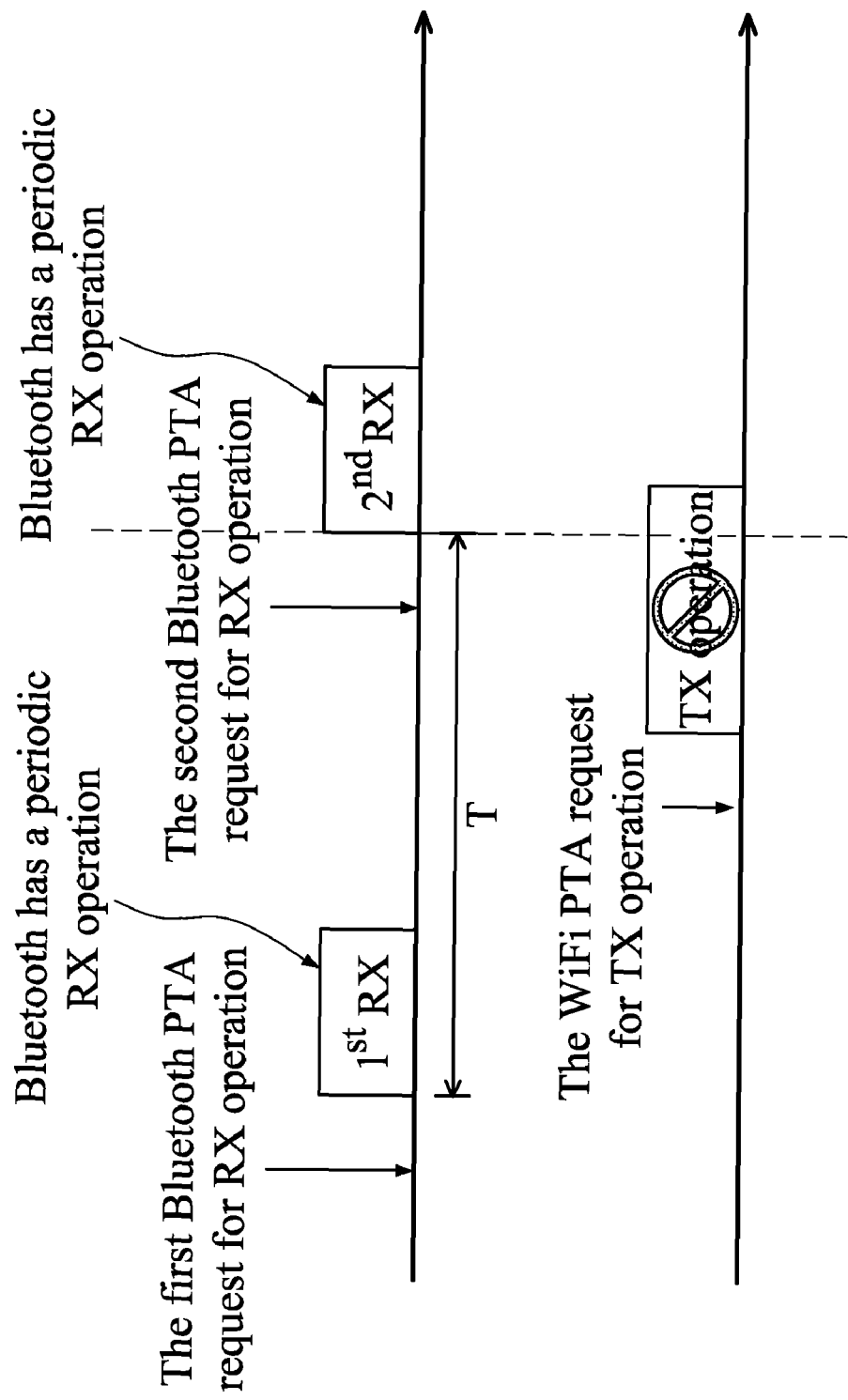
FIG. 7 shows a diagram of a PTA module rejecting a WiFi PTA request according to an interval information of a Bluetooth PTA request.

An embodiment of the PTA module may reject a PTA request for another un-issued periodical PTA request that has a higher priority, which can be predicted by the PTA module 17. For example, referring to FIG. 7, a WiFi PTA request for TX operation comes prior to a second Bluetooth PTA request not issued yet, and the WiFi PTA request is still rejected because the PTA module 17 predicts the second Bluetooth PTA request will be received according to the Interval field 28 specified in the first Bluetooth PTA request.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus, comprising:
a first wireless communication module issuing a first request for a first transmission or reception (TX or RX) operation in a first time period, wherein the first request comprises information regarding a first power level for performing the first TX or RX operation;
a second wireless communication module issuing a second request for a second TX or RX operation in a second time period, wherein the second request comprises information regarding a second power level for performing the second TX or RX operation; and
a packet traffic arbitration (PTA) module coupled between the first wireless communication module and the second wireless communication module, receiving the first request from the first wireless communication module and the second request from the second wireless communication module, and granting one or both of the first request and the second request according to the first power level and the second power level when the first time period is overlapped with the second time period,
wherein the first request is a TX request and the second request is an RX request, and the PTA module further grants both of the first request and the second request if the first power level is lower than a first value and the second power level is higher than a second value.

2. The apparatus as claimed in claim 1, wherein the PTA module further grants both of the first request and the second request if the first power level is lower than the first value, the second power level is higher than the second value, and the first frequency band is separated from the second frequency band by a third value.

3. The apparatus as claimed in claim 1, wherein the first request comprises information regarding a first frequency band and a first priority, the second request comprises a second frequency band and a second priority, and the PTA module determines whether the first request interferes with the second request according to the first and second power levels and the first and second frequency bands, and grants the first request when the first request interferes with the second request and the first priority is higher than the second priority.

4. The apparatus as claimed in claim 3, wherein the PTA module stores a priority table storing information indicating that a first global priority mapped from the first priority is higher than a second global priority mapped from the second priority and determines that the first priority is higher than the second priority with reference to the priority table.

5. The apparatus as claimed in claim 4, wherein the priority table stores information indicating that the highest priority of an WiMAX request is higher than the highest priority of a Bluetooth request and the highest priority of the Bluetooth request is higher than the highest priority of a WiFi request.

6. The apparatus as claimed in claim 4, wherein the priority table stores information indicating that the highest priority of a Bluetooth request is higher than the highest priority of an WiMAX request and the highest priority of the WiMAX request is higher than the highest priority of a WiFi request.

7. The apparatus as claimed in claim 4, wherein the priority table stores information indicating that the highest priority of a Bluetooth request is higher than the highest priority of an WiFi request and the highest priority of the WiFi request is higher than the highest priority of an WiMAX request.

8. An apparatus, comprising:
a first wireless communication module issuing a first request for a first transmission or reception (TX or RX) operation in a first time period, wherein the first request comprises information regarding a first power level for performing the first TX or RX operation;
a second wireless communication module issuing a second request for a second TX or RX operation in a second time period, wherein the second request comprises information regarding a second power level for performing the second TX or RX operation; and
a packet traffic arbitration (PTA) module coupled between the first wireless communication module and the second wireless communication module, receiving the first request from the first wireless communication module and the second request from the second wireless communication module, and granting one or both of the first request and the second request according to the first power level and the second power level when the first time period is overlapped with the second time period,
wherein the first request comprising information regarding a first frequency band with a first priority for performing the first TX or RX operation has been granted by the PTA module and the first TX or RX operation has not finished before reception of the second request, the second request comprises information regarding a second frequency band with a second priority for performing the second TX or RX operation, the PTA module determines to grant the second request and take the granted first request back when detecting that the first request interferes with the second request and the second priority is higher than the first priority according to the information carried by the first and second requests, and then, takes back the first request and grants the second request.

9. A method for responding to grant and rejection signals issued by a packet traffic arbitrator (PTA) module, performed by a wireless communication module of an apparatus, comprising:

receiving a grant signal in response to a previously issued request for requesting the PTA module for performing a wireless communication operation;

receiving a signal indicating that the granted request is rejected by the PTA module before the wireless communication operation finishes; and immediately stopping the wireless communication operation.

10. The PTA method as claimed in claim 9, further comprising:

determining whether the unfinished wireless communication operation is an TX operation;

if so, immediately stopping the unfinished TX operation; and otherwise, continuing the unfinished RX operation.

11. An apparatus, comprising:

a first wireless communication module issuing a first request for a first transmission or reception (TX or RX) operation in a first time period, wherein the first request further comprises information regarding a second time period for performing the next of the first TX or RX operation;

a second wireless communication module issuing a second request for a second TX or RX operation in a third time period overlapping with the second time period after the first TX or RX operation is finished; and a PTA module coupled to the first and second wireless communication modules, determining whether to grant or reject the second request according to information carried by the first and second requests.

12. The apparatus as claimed in claim 11, wherein the first request with a first priority further comprises information regarding a first power level for performing the first TX or RX operation, the second request with a second priority further comprises information regarding a second power level for performing the second TX or RX operation, and the PTA module determines whether to grant or reject the second request according to the first and second power levels and the first and second priorities.

13. The apparatus as claimed in claim 12, wherein the first request is an TX request and the second request is an RX request, and the PTA module further rejects the second request if the first power level is not lower than a first value or the second power level is not higher than a second value; and the first priority is higher than the second priority.

14. The apparatus as claimed in claim 12, wherein the first request is an RX request and the second request is an TX request, and the PTA module further rejects the second request if the first power level is not higher than a first value or the second power level is not lower than a second value; and the first priority is higher than the second priority.

15. The apparatus as claimed in claim 12, wherein the first request further comprises information regarding a first frequency band for performing the first TX or RX operation, the second request further comprises information regarding a second frequency band for performing the second TX or RX operation, and the PTA module further determines whether to grant or reject the second request according to the first and second power levels, the first and second frequency bands, and the first and second priorities.

16. The apparatus as claimed in claim 15, wherein the first request is an TX request and the second request is an RX request, and the PTA module further rejects the second request if the first power level is not lower than a first value or the second power level is not higher than a second value or the first frequency band is not separated from the second frequency band by a third value; and the first priority is higher than the second priority.

17. The apparatus as claimed in claim 15, wherein the first request is an RX request and the second request is an TX request, and the PTA module further rejects the second request if the first power level is not higher than a first value or the second power level is not lower than a second value or the first frequency band is not separated from the second frequency band by a third value; and the first priority is higher than the second priority.

18. The apparatus as claimed in claim 11, wherein the first request is a periodical request, the second time period is carried by two fields, in which one indicating a fourth time period between the start of the next of the first TX or RX operation and the issuance time of the current of the first TX or RX operation; and the other indicating the time length for performing the first TX or RX operation.

* * * * *